May 22, 1962 L. S. HAMER 3,035,811
SEALING RING
Filed Nov. 10, 1959
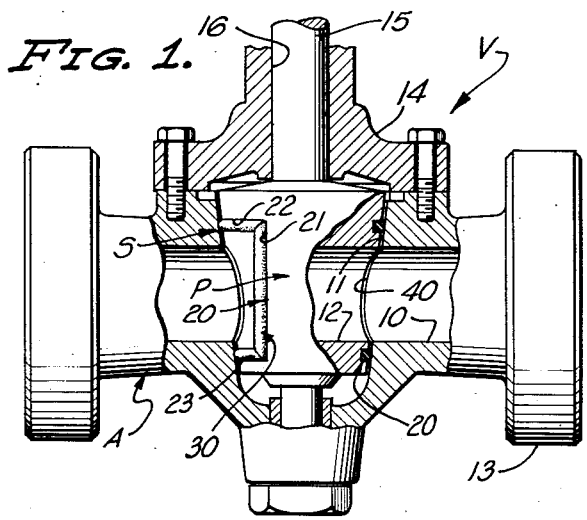
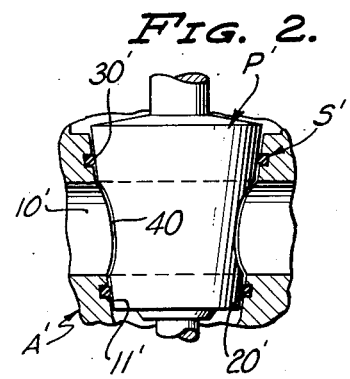
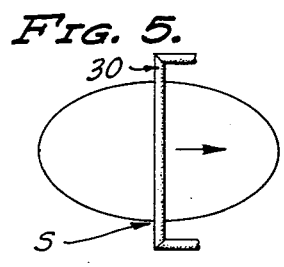
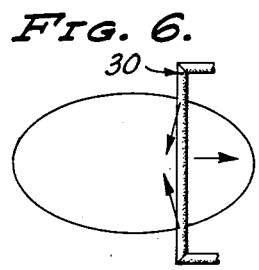
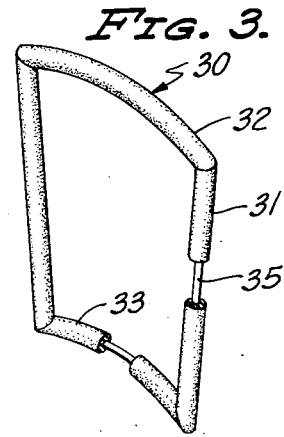
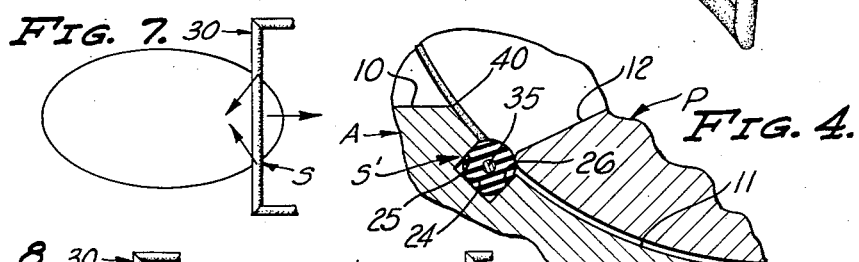
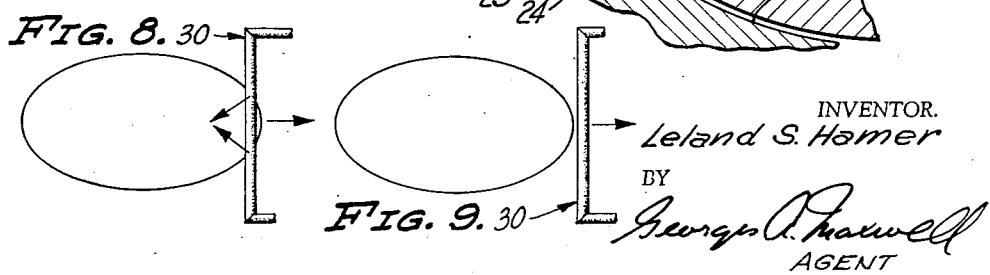
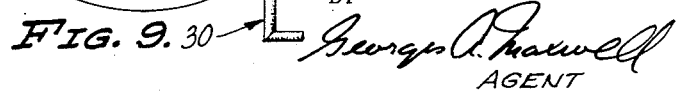
INVENTOR.
Leland S. Hamer
BY
George A. Maxwell
AGENT "# United States Patent Office 3,035,811
Patented May 22, 1962

3,035,811
SEALING RING
Leland S. Hamer, Long Beach, Calif., assignor to Chiksan Company, Brea, Calif., a corporation of California
Filed Nov. 10, 1959, Ser. No. 852,131
4 Claims. (Cl. 251—317)

This invention relates to a novel plug valve construction and sealing ring therefor.

The ordinary plug valve construction includes a body having a central, longitudinal flow passage extending therethrough, a chamber intersecting the flow passage, a ported valve member or plug engaged in the chamber and a suitable operating means for rotating the plug in the chamber to shift the port therein into and out of register with the flow passage and so as to control the flow of fluid through the valve. The chamber and the plug are generally tapered and the operating means is such that when the plug is rotated to a closed position, where the port therein is out of register with the flow passage, it establishes tight wedging and sealing engagement in the chamber, or the operating means is such that the axial position of the plug in the chamber can be set so that the plug establishes sliding sealing engagement in the chamber.

In either situation, the sealing effect is established by the metal to metal contact between the plug and the chamber and is adversely affected and destroyed by wear, temperature variations and/or distortion as a result of fluid or gas pressure exerted throughout the construction.

Numerous and varied attempts have been made to overcome and correct the various factors which bring about the rapid deteriorating and failure of plug valves, but each has either failed or resulted in a construction which is so complicated and costly as to be impractical.

Certain attempts have been made to provide sealing rings in suitable grooves in the plug or in the body to occur about the port or flow passage and to seal with the opposing member, but such attempts have failed due to the fact that the flow of fluid through the valve and past the rings, when the valve is cracked or partially opened, washes the ring out of the grooves and so that when the plug is rotated to a closed position and the edges or corners defined by the flow passage and chamber and by the port and the wall of the plug pass or move by each other, they shear and cut the rings, rendering them useless.

An object of the present invention is to provide a novel sealing means for plug valves, which means includes a novel sealing ring.

Another object of this invention is to provide a sealing ring adapted to be engaged in a groove in the wall of the valve chamber, about the flow passage, or in a groove in the plug, about the port.

Another object of the present invention is to provide a sealing ring for the purpose referred to which is cooperatively related to the plug and body so that it is retained in engagement in the groove thereby and is not subject to displacement therefrom as by the flow of gas or fluid thereby.

A further object of my invention is to provide a sealing ring of novel construction and configuration and which is such that it is not subject to becoming displaced from proper working engagement in the structure to which it is related.

Still another object of my invention is to provide a construction of the general character referred to wherein the ring is formed and is related to the plug and body so that when the ring is advanced or moved by the edge defined by the port or flow passage of the opposing part, the said edge serves to wipe the ring into the groove.

A feature of my invention is to provide sealing means including, a ring having straight, axially disposed side portions to occur in straight, axially disposed portions of a sealing ring groove in a cylindrical part of a fluid handling structure, arcuate end portions extending between the ends of the side portions of the ring and engageable in circumferential connecting portions of the groove, said end portions of the ring connected with the ends of the side portions and engaged in the arcuate portions of the groove, serving to hold and prevent axial shifting of the side portions of the ring in their respective portions of the groove.

A further object of this invention is to provide a reinforcing core in the ring to prevent stretching of the ring in a manner which would permit displacement thereof from the groove and to maintain the ring in proper configuration for engagement in the groove.

A general object of my invention is to provide a novel sealing means for use in connection with any structure having relatively rotatable ported parts wherein it is desired to seal between the said parts about the ports therein.

The various objects and features of my invention will be fully understood from the following detailed description of typical preferred forms and applications of my invention, throughout which description reference is made to the accompanying drawings, in which:

FIG. 1 is a side elevational view of a typical plug valve construction with my new sealing means related thereto.

FIG. 2 is a fragmentary view of a portion of a valve construction such as is shown in FIG. 1 and having a modified form of my sealing means related thereto.

FIG. 3 is a perspective view of the sealing ring that I provide, showing a portion broken away to better illustrate the construction.

FIG. 4 is an enlarged detailed transverse sectional view of a portion of the structure shown in FIG. 2 and showing the parts of the valve in a partially open position.

FIGS. 5 through 9 are diagrammatic views indicating a feature of the operation of my new sealing means in sequence.

The valve construction V illustrated in the drawings, is a typical plug valve construction and includes generally, an elongate, horizontally disposed body A with a central flow passage 10, round in cross-section, extending longitudinally therethrough and a vertically disposed, upwardly opening chamber 11 intermediate the ends thereof and intersecting the flow passage, and a plug P rotatably engaged in the chamber and having a port 12, round in cross-section extending therethrough and adapted to be shifted into and out of register with the flow passage in the body.

In accordance with normal valve construction, the ends of the body are provided with suitable pipe coupling means, such as flanges 13 and the upper open end of the chamber is closed by a suitable closure 14.

The plug P is provided with an upwardly projecting operating stem 15, which projects through an opening 16 in the closure 14, for access at the exterior of the valve and to facilitate rotating of the plug.

The chamber 11 in the body is cylindrical in cross-section and can, as illustrated, be tapered downwardly.

The plug P is cylindrical in cross-section and is also tapered downwardly, so as to cooperatively engage in the chamber.

In practice, the opposing walls or surfaces in the chamber and on the plug can be suitably ground or honed to establish smooth sliding engagement with each other.

In the drawings, I have indicated substantial working clearance between the plug and the wall of the chamber for the purpose of better illustrating the invention.

In practice, the chamber 11 can be a straight, cylindrical bore and the plug a straight, cylindrical member without in any way affecting the novelty of the invention.

The other details of the valve construction illustrated, do not affect the invention and can be varied widely in practice; accordingly I will not burden this application with further unnecessary description thereof.

The sealing means S that I provide and which is the subject of the present invention involves a groove 20 in the plug P extending about the open end of the port at one side thereof and a sealing ring 30 engaged in the groove 20 to seal therein and to project therefrom and seal with the opposing wall of the chamber 11.

In practice, and as illustrated in the drawings, the sealing means S can be duplicated at the opposite side of the plug, to occur about the other open end of the plug.

The groove 20 for the ring 30 has straight, axially disposed side portions 21 and top and bottom portions 22 and 23. The side portions 21 are of substantial longitudinal extent so that the upper and lower ends thereof terminate at points spaced above and below the upper and lowermost portions of the port in the plug and flow passage in the body.

The top and bottom portions 22 and 23 of the groove 20 can be of any suitable lineal shape, however, it is preferred that they be horizontal to extend about the outer perimeter of the plug and connect the ends of the side portions related thereto.

The several portions of the groove 20 are preferably of uniform cross-section and have radially outwardly disposed bottoms 24 and radially disposed inner and outer side walls 25 and 26.

The sealing ring 30 that I provide corresponds in general plane configuration with the groove 20, having straight side portions 31 and top and bottom portions 32 and 33. The side portions 31 are straight and correspond in longitudinal extent with the side portion 21 of the groove and the top and bottom portions 32 and 33 are horizontally disposed, arcuate portions, extending between the ends of the side portions and cooperatively engaged in the top and bottom portions of the groove.

The ring 30 is formed of rubber or other like resilient material and is preferably round in cross-section throughout its entire extent and is such that when it is engaged in the groove 20, it seats on the bottom 24 of the groove, bears on the inner and outer side walls 25 and 26 of the groove and projects radially outward from the groove a sufficient distance or amount to establish bearing sealing engagement with the opposing wall of the chamber.

From the foregoing, it will be apparent that the sealing ring 30 is, in effect, an O-ring seal of substantially square or rectangular plane configuration.

It is to be underestood that the ring 30 could be other than round in cross-section and that the particular configuration illustrated is only typical of the preferred carrying out of the invention.

The ring 30 further includes a core 35 of steel wire, or the like, which core serves to maintain the ring in proper configuration and prevents the various portions thereof from stretching and elongating in such a manner and to such an extent that the same portions could become displaced from their respective portions of the groove 20.

The core preferably extends continuously through the ring, with its ends abutting and/or connecting intermediate the ends of the top or bottom portions of the ring.

In practice, the core could be sectioned and only extend along the side portions 31 of the ring, which portions of the ring are the only portions which must be prevented from stretching and elongating when the structure is in use.

When the ring is engaged in the groove in the plug and the plug is engaged in the chamber in the body, the top and bottom portions of the groove and of the ring, and the upper and lower end portons of the said side portions of the groove and ring occur above and below the flow passage extending through the body so that when the plug is rotated in the chamber, only the central portions of the side portions of the groove and rings are exposed to the flow passage and subjected to the reaction of the gas or liquid flowing therethrough.

Due to the fact that the flow passage 10 is round and the wall of the chamber 11 is round, the edge 40 defined by the walls of the flow passage and chamber is elliptical, as illustrated diagrammatically in FIGS. 5 through 9 of the drawings. As a result of the foregoing, when the axially disposed side portions 31 of the ring 30 are advanced or moved across the flow passage, the edge 40 serves, by utilizing the principle of the inclined plane, to wipe and urge the side portions of the ring axially inwardly from their opposite end portions and radially inwardly into the groove.

Due to the elliptical shape of the edge 40, the wiping effect mentioned above does not take effect until the ring has parted the center of the flow passage and is at first gentle, when the greatest portion of the ring is exposed, or out of engagement with the wall of the chamber, and becomes progressively more acute as the ring is advanced and a lesser amount thereof is exposed and until the ring finally passes the said edge, at which point the ring is no longer fully exposed its entire width and which is the only point that the direction of travel of the ring is normal to the edge.

The above function or operation is clearly illustrated in the several FIGS. 5 through 9.

It will be apparent that if the flow passage was square and defined axially disposed side edges, the edge engaged by the side portion of the ring, as the ring is advanced past the passage, would engage the said side portion of the ring uniformly through the entire extent of the exposed portion thereof and in such a manner as would pinch and cut the ring, especially should a portion of the ring blow out of the groove, as a result of fluid or gas flowing thereabout.

The above adverse effects would also result, but to possibly a lesser degree, if the flow passage and the sealing ring were both round.

In practice, the edge 40 is preferably rounded slightly to eliminate any sharp cutting edge and to assist in the function of wiping the ring into proper engagement in the groove, but not to an extent as would interfere with the free, uninterrupted flow of fluid through the valve, when it is open.

It will be apparent that the core 35 in the ring 30 prevents the side portions 31 thereof from stretching and so that when the said side portions are advanced by the flow passage and the valve is partially open, the velocity of the flow of fluid past the ring will not wash and urge the ring from proper engagement in the groove to any appreciable extent.

Still further, it will be apparent that since the end portions of the side portions 31 of the ring are not exposed when the ring passes the center of the flow passage, and since the said side portions are integrally joined to the top and bottom portions 32 and 33 of the ring occurring in the top and bottom portions of the groove 20, the ends of the side portion of the ring are suitably secured and anchored against any axial movement relative to the plug and the side portions of the groove and which would otherwise allow for displacement of the side portion of the ring from the groove. That is to say, the top and bottom portions of the ring serve to anchor the ends of the side portions of the ring.

Since the top and bottom portions of the ring always occur in engagement with the wall chamber, when the construction is in operation, they are maintained in engagement in the groove and are not subject to being displaced therefrom.

In practice, as illustrated in FIG. 2 of the drawings, the groove or grooves 20' are established in the wall of the chamber 11' to occur about the open ends of the flow passage 10' and the sealing rings 30' are engaged in the groove to seal with the ported plug P'. Except for the reversed or altered positioning of the groove and the fact that the port in the plug is moved past the sealing ring, rather than the sealing ring passing the flow passage, this modified construction operates in the same manner as does the first preferred form of the invention.

From the foregoing, it will be apparent that I have invented a novel, highly effective and dependable sealing means for a plug valve and the like, a structure which is easy and economical to manufacture and a sealing means which is such that it can be readily applied to existing plug valve constructions with a minimum of time and effort and without material remodification.

Having described only typical preferred forms and applications of my invention, I do not wish to be limited or restricted to the specific details herein set forth, but wish to reserve to myself any modifications or variations that may appear to those skilled in the art and fall within the scope of the following claims:

Having described my invention, I claim:

1. A fluid handling structure including, two members having opposed, cylindrical surfaces having a common axis, each member having a cylindrical fluid handling port extending therethrough and intersecting the said surface thereon, said members adapted to be rotated relative to each other about said axis to shift said ports into and out of register with each other; and sealing means to seal between the members and about one of the ports and including a groove in the surface of one of the members to extend about the port therein and opposing the surface on said other member, said groove having substantially axially disposed side portions and circumferentially disposed end portions, and a resilient sealing ring having axially disposed side portions and arcuate end portions cooperatively engaged in the side and end portions of the groove to seal therein and projecting therefrom to seal with the surface of said other member, said sealing ring having a core of high tensile material extending therethrough to maintain the ring in proper configuration and to prevent stretching of the ring and resulting displacement thereof from the groove.

2. A plug valve construction including, an elongate body with a central, longitudinal, cylindrical flow passage extending therethrough and a vertically disposed cylindrical valve chamber intermediate the ends of the body and intersecting the flow passage, a cylindrical valve member slidably engaged in the chamber and having a cylindrical port extending through it, said valve member rotatable in the chamber to shift the port therein into and out of register with the flow passage; and sealing means to seal between the wall of the chamber and the valve member about the open ends of the port and including, a radially outwardly opening groove in the valve member about each end of the port extending therethrough, and a resilient sealing ring engaged in each groove to seal therein and projecting therefrom to engage and seal with the opposing wall of the chamber, each groove and sealing ring having axially disposed side portions occurring at diametrically opposite sides of the port and adapted to move past the open end of the flow passage related thereto when the valve is operated, and arcuate end portions extending circumferentially of the valve member at opposite sides of the end of the port related thereto, said end portions of the sealing ring being maintained in engagement in the groove by the wall of the chamber, said sealing rings having a high tensile core extending therethrough to maintain the rings in proper configuration and to prevent the side portions thereof from stretching when the valve is operated and the said side portions are exposed to the fluid stream.

3. A plug valve construction including, an elongate body with a central, longitudinal, cylindrical flow passage extending therethrough and a vertically disposed cylindrical valve member intermediate the ends of the body and intersecting the flow passage, a cylindrical valve member slidably engaged in the chamber and having a cylindrical port extending through it, said valve member rotatable in the chamber to shift the port therein into and out of register with the flow passage; and sealing means to seal between the wall of the chamber and the valve member about the open ends of the flow passage in the chamber and including, a radially inwardly opening groove in the wall of the chamber about each open end of the flow passage, and a resilient sealing ring engaged in each groove to seal therein and projecting therefrom to engage and seal with the valve member, each groove and sealing ring having axially disposed side portions occurring at diametrically opposite sides of the related open end of the flow passage, and each groove and sealing ring having arcuate end portions connecting said side portions and extending circumferentially of the chamber at opposite sides of the open end of the flow passage related thereto, said end portions of the sealing rings being engaged by the valve member at all itmes and maintained in the groove thereby, said sealing rings having a high tensile core extending therethrough to maintain the rings in proper configuration and to prevent the side portions thereof from stretching when the valve is operated and the said side portions are exposed to the fluid stream.

4. A plug valve construction including, an elongate body having upstream and downstream ends with a central, longitudinal, cylindrical flow passage extending therethrough and a vertically disposed cylindrical valve chamber intermediate the ends of the body and intersecting the flow passage, a cylindrical valve member slidably engaged in the chamber and having a cylindrical port extending through it, said valve member rotatable in the chamber to shift the port therein into and out of register with the flow passage; and sealing means to seal between the wall of the chamber and the valve member about the open end of the flow passage in the upstream side of the chamber and including, a radially inwardly opening groove in the wall of the chamber about said open end of the flow passage, and a resilient sealing ring engaged in the groove to seal therein and projecting therefrom to engage and seal with the valve member, the groove and sealing ring having axially disposed side portions occurring at diametrically opposite sides of the said open end of the flow passage and arcuate end portions connecting said side portions and extending circumferentially of the chamber at opposite sides of said open end of the flow passage, said end portions of the sealing ring being engaged by the valve member at all times and maintained in the groove thereby, said sealing ring having a high tensile core extending therethrough to maintain the ring in proper configuration and to prevent the side portions thereof from stretching when the valve is operated and the said side portions are exposed to the fluid stream.

References Cited in the file of this patent

UNITED STATES PATENTS

| | | |
|---|---|---|
| 1,026,457 | Reynolds | May 14, 1912 |
| 2,433,732 | Brown | Dec. 30, 1947 |
| 2,510,514 | Mueller | June 6, 1950 |
| 2,604,293 | Phillips | July 22, 1952 |
| 2,621,881 | Allen | Dec. 16, 1952 |
| 2,661,182 | Kipp | Dec. 1, 1953 |